(12) United States Patent
Yoshida et al.

(10) Patent No.: US 10,230,485 B2
(45) Date of Patent: Mar. 12, 2019

(54) STATION-SIDE DEVICE AND WAVELENGTH CHANGEOVER METHOD

(71) Applicant: NIPPON TELEGRAPH AND TELEPHONE CORPORATION, Tokyo (JP)

(72) Inventors: Tomoaki Yoshida, Yokosuka (JP); Kota Asaka, Yokosuka (JP); Shunji Kimura, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/564,231

(22) PCT Filed: Apr. 20, 2016

(86) PCT No.: PCT/JP2016/062490
§ 371 (c)(1),
(2) Date: Oct. 4, 2017

(87) PCT Pub. No.: WO2016/171162
PCT Pub. Date: Oct. 27, 2016

(65) Prior Publication Data
US 2018/0131461 A1    May 10, 2018

(30) Foreign Application Priority Data
Apr. 22, 2015  (JP) ................ 2015-087854

(51) Int. Cl.
*H04J 14/00* (2006.01)
*H04J 14/02* (2006.01)
(Continued)

(52) U.S. Cl.
CPC .......... *H04J 14/0247* (2013.01); *H04J 14/02* (2013.01); *H04J 14/0223* (2013.01);
(Continued)

(58) Field of Classification Search
CPC ............... H04J 14/0238; H04J 14/0239; H04J 14/0246; H04J 14/0227; H04J 14/0245;
(Continued)

(56) References Cited

U.S. PATENT DOCUMENTS

2007/0092256 A1    4/2007 Nozue et al.
2014/0161461 A1    6/2014 Lee et al.
(Continued)

FOREIGN PATENT DOCUMENTS

JP     2014-515221 A    6/2014
JP     2015-026939 A    2/2015
WO    WO-2012/136155 A1    10/2012

OTHER PUBLICATIONS

S. Kimura, WDM/TDM-PON technologies for future flexible optical access networks, OECC2010, 6A1-1, 2010.
(Continued)

*Primary Examiner* — Hanh Phan
(74) *Attorney, Agent, or Firm* — Harness, Dickey & Pierce, P.L.C.

(57) ABSTRACT

In a case where a wavelength to be assigned to a subscriber-side device, to which a downstream wavelength has been assigned, is to be changed from the currently used (Source) downstream wavelength to a different changeover target (Target) downstream wavelength, a downstream wavelength changeover instruction message that indicates the change target wavelength is generated. In a case where a wavelength to be assigned to the subscriber-side device, to which an upstream wavelength has been assigned, is to be changed from the currently used (Source) upstream wavelength to a different changeover target (Target) upstream wavelength, an upstream wavelength changeover instruction message that indicates the change target wavelength is generated. The downstream wavelength changeover instruction message and the upstream wavelength changeover instruction mes-
(Continued)

sage are respectively independently generated, and only the wavelength for which the wavelength changeover instruction message was generated is changed.

5 Claims, 14 Drawing Sheets

(51) Int. Cl.
  *H04L 12/44* (2006.01)
  *H04L 12/803* (2013.01)
  *H04Q 11/00* (2006.01)
  *H04L 12/923* (2013.01)

(52) U.S. Cl.
  CPC ............ *H04L 12/44* (2013.01); *H04L 47/125* (2013.01); *H04Q 11/0067* (2013.01); *H04L 47/762* (2013.01); *H04Q 2011/0083* (2013.01); *H04Q 2011/0086* (2013.01)

(58) Field of Classification Search
  CPC .. H04J 14/025; H04J 14/0252; H04J 14/0247; H04Q 11/0067; H04L 47/125

USPC ...... 398/66, 67, 68, 69, 70, 71, 72, 100, 79, 398/33, 45, 48, 58, 74, 75, 98, 99; 370/352, 392, 389, 468, 465
  See application file for complete search history.

(56) References Cited

U.S. PATENT DOCUMENTS

| | | | |
|---|---|---|---|
| 2014/0248053 A1 | 9/2014 | Tamai | |
| 2015/0229431 A1* | 8/2015 | Sugawa | H04J 14/0257 398/72 |
| 2015/0365192 A1* | 12/2015 | Kim | H04J 14/0256 398/66 |

OTHER PUBLICATIONS

International Search Report for PCT/JP2016/062490, ISA/JP, Tokyo, dated Jul. 12, 2016, with English translation.
Extended European Search Report issued in parallel application EP 16783183.3, EPO, Munich, dated Aug. 20, 2018.
Japanese Office Action in parallel application JP 2017-514154, JPO, dated Mar. 27, 2018, with English translation thereof.

* cited by examiner

PRIOR ART

FIG. 13

| ONU93 ID | SIGNAL DIRECTION | OSU10 ID | SNI54 ID |
|---|---|---|---|
| #1 | UPSTREAM | #1 | #1 |
| #1 | DOWNSTREAM | #2 | #1 |
| #4 | UPSTREAM | #4 | #1 |
| #4 | DOWNSTREAM | #2 | #1 |

STATION-SIDE DEVICE AND WAVELENGTH CHANGEOVER METHOD

TECHNICAL FIELD

The present invention relates to a technique relating to a dynamic change method of an upstream wavelength and a downstream wavelength in a PON (Passive Optical Network) in which wavelength multiplexing and time division multiplexing are combined.

This application is a 371 U.S. National Phase of PCT/JP2016/062490, filed on Apr. 20, 2016. Priority is claimed on Japanese Patent Application No. 2015-087854, filed on Apr. 22, 2015, the content of which is incorporated herein by reference.

BACKGROUND ART

The spread of FTTH (Fiber To The Home) is progressing globally due to an increasing need for high-speed access services. Most FTTH services are provided by an economically excellent PON (Passive Optical Network) system, in which a single storage station-side device (OSU: Optical Subscriber Unit) stores a plurality of subscriber-side devices (ONU: Optical Network Unit) by time division multiplexing (TDM).

In an upstream communication by a TDM-PON system, the system bandwidth is shared between the ONUs based on a dynamic bandwidth allocation calculation in the OSU, and each ONU intermittently transmits an optical signal only within a transmission permission time period notified by the OSU, thereby preventing collision between optical signals.

The current main systems are GE-PON (Gigabit Ethernet (registered trademark) PON) and G-PON (Gigabit-capable PON), which have gigabit-level transmission speeds. In addition to the progress of video distribution services, the emergence of applications that upload/download large-capacity files requires further increases in the capacity of PON systems.

However, in the TDM-PON system described above, since the system bandwidth is expanded by increasing the line rate, the reception characteristics are greatly deteriorated due to the effects of higher speed and wavelength dispersion, and further, the economy of the burst transceiver becomes a problem, thereby making it difficult to increase the capacity to more than 10 gigabytes.

Application of a wavelength division multiplexing (WDM) technique is being investigated for increasing the capacity to more than 10 gigabytes. FIG. 1 is an example of a WDM/TDM-PON system in which a WDM technique is combined with a TDM-PON system related to the present invention.

The WDM/TDM-PON system shown in FIG. 1 includes OSUs 10 #1 to #M and a plurality of ONUs 93. The OSUs 10 #1 to #M respectively communicate with the plurality of ONUs 93 using a wavelength set of $\lambda_{U\_1,D\_1}$ to $\lambda_{U\_M,D\_M}$. Here, $\lambda_{U\_1,D\_1}$ indicates a combination of an upstream signal wavelength $\lambda_{U\_1}$ and a downstream signal wavelength $\lambda_{D\_1}$.

The OSU in the present specification refers to an OLT CT (Channel Termination) prescribed by the International Standard ITU-T (Telecommunication standardization of International Telecommunication Union) G.989.3 (40-Gigabit-capable passive optical networks (NG-PON 2): Transmission Convergence Layer Specification). Furthermore, the WDM/TDM-PON in the present specification refers to a TWDM-PON (Time and Wavelength Division Multiplexing-PON) prescribed by the International Standard ITU-T G.989 series.

Each ONU 93 is fixedly assigned a downstream wavelength and an upstream wavelength according to the terminal of a wavelength routing unit 94-1 to which it is connected. Temporal signal overlap among all ONUs 93 is permitted for #1 to #M, that is to say, up to the number of OSUs 10. Consequently, by adding an OSU 10, the system bandwidth can be expanded without increasing the line rate per wavelength.

Among the terminals of the wavelength routing unit 94-1, each ONU 93 connected to the same terminal on the ONU 93 side and connected to an optical fiber transmission line 96 is logically connected to the same OSU 10, and share an upstream bandwidth and a downstream bandwidth.

For example, the ONUs 93 #2-1 to #2-K are logically connected to the OSU 10 #2. Here, the logical connection between each ONU 93 and the OSU 10 is constant, and it is not possible to distribute traffic load among different OSUs 10 #1 to #M according to the state of traffic load of each OSU 10.

On the other hand, as shown in FIG. 2, proposed is a wavelength tunable WDM/TDM-PON system whose optical transmitter and optical receiver mounted on the ONU 93 are equipped with a wavelength tuning function (for example, refer to Non-Patent Document 1).

The ONU 93 includes a wavelength tunable light transmission unit 31, a wavelength tunable light reception unit 32 having a light receiving unit 321 and a wavelength tunable filter 322, and a wavelength multiplexing and demultiplexing unit 33.

The wavelength multiplexing and demultiplexing unit 33 outputs an optical signal to the wavelength tunable light reception unit 32, and receives an optical signal from the wavelength tunable light transmission unit 31. The wavelength tunable filter 322 inputs to the light receiving unit 321, a signal of a wavelength selected by performing filtering of the optical signal output by the wavelength multiplexing and demultiplexing unit 33. The optical multiplexing and demultiplexing units 92-1 and 92-2 and the optical fiber transmission line 96 connect an OLT 91 and the ONU 93.

In the configuration of Non-Patent Document 1, it is possible to individually change the logical connection destination OSU 10 of each ONU 93 by switching the transmission/reception wavelength in the ONU 93. As a result of using this function, when there is an OSU 10 in a high-load state, the logical connection between the ONU 93 and the OSU 10 is changed so that the traffic load is dispersed to an OSU 10 in a low-load state, and it is possible to prevent a deterioration in the communication quality of the OSU 10 in the high-load state.

Furthermore, when a high-load state of an OSU 10 regularly occurs, in the WDM/TDM-PON system of FIG. 1, it is necessary to add system bandwidth in order to ensure a fixed communication quality. On the other hand, in the wavelength tunable WDM/TDM-PON system of FIG. 2, it is possible to ensure a fixed communication quality by effectively utilizing the bandwidth of the entire system by distributing the traffic load among the OSUs 10, and capital investments for expanding the system bandwidth can be suppressed.

FIG. 3 shows an example of wavelength assignment in the wavelength tunable WDM/TDM-PON system related to the present invention. In FIG. 3, a bandwidth of 6 Gbit/s total is used for the OSU 10 #1, which includes a downstream signal

1 (1 Gbit/s) and a downstream signal #2 (5 Gbit/s). Furthermore, a downstream signal #3 uses a bandwidth of 6 Gbit/s.

Moreover, for the upstream, the ONU 93 #1 uses a bandwidth of 2 Gbit/s of the OSU 10 #1 for an upstream signal #1. In addition, the ONU 93 #2 uses a bandwidth of 7 Gbit/s by utilizing the OSU 10 #1 for an upstream signal #2. The ONU 93 #3 uses a bandwidth of 1 Gbit/s by utilizing the OSU 10 #2 for an upstream signal #3.

In this case, since the upstream bandwidth used in the OSU 10 #1 is likely to exceed 9 Gbit/s (due to the upstream signals #1 and #2 described above), the OLT 91 performs a wavelength change instruction such that the upstream signal of the ONU 93 #2 (equivalent to 7 Gbit/s) utilizes the OSU 10 #2.

However, in this case, the downstream signal of the ONU 93 #2 (equivalent to 2.5 Gbit/s) is also changed from the OSU 10 #1 to the OSU 10 #2 at the same time as the switching of the upstream signal.

Consequently, as shown in FIG. 4, the total bandwidth of the downstream signals utilizing the OSU 10 #2 is 11 Gbit/s (the sum of the downstream signal #2 and the downstream signal #3), which exceeds the upper limit of 10 Gbits/s. Therefore, switching cannot be performed as in FIG. 4.

In a wavelength changeover related to the present invention, upstream wavelength and downstream wavelength pairs are assumed to be fixed. Consequently, for example, within the control frame transmitted by the OLT 91 shown in FIG. 5, the wavelength changeover instruction message B also instructs a wavelength changeover for an upstream wavelength and downstream wavelength pair. Here, A, C, D, and E are, for example, a destination address, a source address, a time stamp, and a message identification code of the wavelength changeover instruction message.

Since the control frame shown in FIG. 5 is similar to the frame structure used in the PON architecture described above, existing parts can be applied and cost can be reduced. However, when the upstream wavelength or the downstream wavelength is changed, the other is dragged along with it. Therefore, it is impossible to realize an improvement in the bandwidth utilization efficiency and equitability for both the upstream and the downstream. Further, a bias occurs toward the load distribution of either the upstream or the downstream. When the load distribution is considered, only one load distribution is considered and load distribution of the other is not performed.

Furthermore, at events where there is a concentration of users and the like, if there is a rapid increase in the used bandwidth of only the downstream of a specific ONU 93 resulting from a rapid increase in users under the same ONU 93, then needs such as a change in only the downstream signal wavelength of the ONU 93 to perform bandwidth distribution can be considered. However, in the wavelength tunable WDM/TDM-PON system related to the present invention, since the wavelength of the upstream signal is changed together with the change in the downstream signal, and conversely, since there is a case where the total bandwidth of the ONU 93 using the upstream wavelength exceeds the transmittable bandwidth, it is difficult to realize load distribution of both the upstream and the downstream.

PRIOR ART DOCUMENTS

Non-Patent Document

[Non-Patent Document 1] S. Kimura, "WDM/TDM-PON technologies for future flexible optical access networks," OECC2010, 6A1-1, 2010

SUMMARY OF INVENTION

Problem to be Solved by the Invention

An object of the present invention is to individually improve upstream and downstream band utilization efficiency according to the respective traffic volumes of upstream and downstream signals in a wavelength tunable WDM/TDM-PON system.

Means for Solving the Problem

The present invention performs dynamic wavelength and bandwidth allocation for at least either an upstream and or downstream signal in a wavelength tunable WDMTDM-PON system.

Specifically, a station-side device performs transmission and reception of optical signals with respect to a plurality of subscriber-side devices, by wavelength division multiplexing and time division multiplexing, and the station-side device includes:

a plurality of light transmission units, each of the light transmission units transmitting a downstream signal to one or more subscriber-side devices using a predetermined downstream wavelength;

a plurality of light reception units, each of the light reception units receiving an upstream signal from one or more subscriber-side devices using a predetermined upstream wavelength; and a wavelength change instruction unit that generates a downstream wavelength changeover instruction message in a case where a wavelength assigned to the subscriber-side device, to which a downstream wavelength of a downstream signal transmitted by the light transmission unit has been assigned, is to be changed from a currently used (Source) downstream wavelength transmitted by the light transmission unit, to a changeover target (Target) downstream wavelength, the changeover target (Target) downstream wavelength being different from the downstream wavelength, the downstream wavelength changeover instruction message indicating the changeover target (Target) downstream wavelength, the wavelength change instruction unit generating an upstream wavelength changeover instruction message in a case where a wavelength assigned to the subscriber-side device, to which an upstream wavelength of an upstream signal received by the light reception unit has been assigned, is to be changed from a currently used (Source) upstream wavelength received by the light reception unit, to a changeover target (Target) upstream wavelength, the changeover target (Target) upstream wavelength being different from the currently used (Source) upstream wavelength, the upstream wavelength changeover instruction message indicating the changeover target (Target) upstream wavelength, the wavelength change instruction unit independently generates the downstream wavelength changeover instruction message and the upstream wavelength changeover instruction message, and changes only the wavelength for which the wavelength changeover instruction message is generated.

In the station-side device according to the present invention, the wavelength change instruction unit may add in a wavelength changeover instruction message, the respective upstream and downstream wavelengths after changing, the wavelength change instruction unit may transmit to the subscriber-side device to be changed from the currently used (Source) downstream wavelength to the changeover target (Target) downstream wavelength, the wavelength changeover instruction message including the currently used (Source) upstream wavelength and the changeover target (Target) downstream wavelength, and the wavelength change instruction unit may transmit to the subscriber-side device to be changed from the currently used (Source) upstream wavelength to the changeover target (Target) upstream wavelength, the wavelength changeover instruction message including the changeover target (Target) upstream wavelength and the currently used (Source) downstream wavelength.

Furthermore, the station-side device according to the present invention may further include:

a light transmission state monitoring unit that monitors a total transmission bandwidth that the light transmission unit transmits to the one or more subscriber-side devices; and a light reception state monitoring unit that monitors a total reception bandwidth that the light reception unit receives from the one or more subscriber-side devices, in a case where the total reception bandwidth matches a predetermined condition, the wavelength change instruction unit may change a wavelength assigned to the subscriber-side device, to which an upstream wavelength received by a light reception unit matching the predetermined condition has been assigned, from a currently used (Source) upstream wavelength received by the light reception unit, to a changeover target (Target) upstream wavelength that is different from the currently used (Source) upstream wavelength, and in a case where the total transmission wavelength matches a predetermined condition, the wavelength change instruction unit may change a wavelength assigned to the subscriber-side device, to which a downstream wavelength transmitted by a light transmission unit matching the predetermined condition has been assigned, from a currently used (Source) downstream wavelength transmitted by the light transmission unit, to a changeover target (Target) downstream wavelength that is different from the downstream wavelength.

The station-side device according to the present invention may further include:

a light transmission state monitoring unit that monitors a transmission bandwidth ratio, the transmission bandwidth being a ratio of a total bandwidth transmitted by the light transmission unit to the one or more subscriber-side devices, to a bandwidth that the light transmission unit is capable of transmitting; and a light reception state monitoring unit that monitors a reception bandwidth ratio, the reception bandwidth ratio being a ratio of a total bandwidth received by the light reception unit from the one or more subscriber-side devices, to a bandwidth that the light reception unit is capable of receiving, in a case where an increase in the transmission bandwidth ratio becomes a predetermined value or more within a previously determined predetermined time period, the wavelength change instruction unit may change a wavelength assigned to the subscriber-side device, to which a downstream wavelength transmitted by the light transmission unit whose increase becomes the predetermined value or more has been assigned, from a currently used (Source) downstream wavelength transmitted by the light transmission unit, to a changeover target (Target) downstream wavelength that is different from the downstream wavelength, and in a case where an increase in the reception bandwidth ratio becomes a predetermined value or more within a previously determined predetermined time period, the wavelength change instruction unit may change a wavelength assigned to the subscriber-side device, to which an upstream wavelength received by the light reception unit whose increase becomes the predetermined value or more has been assigned, from a currently used (Source) upstream wavelength received by the light reception unit, to a changeover target (Target) upstream wavelength that is different from the currently used (Source) upstream wavelength.

In a station-side device according to the present invention, the wavelength change instruction unit may determine a downstream wavelength transmitted by a light transmission unit having a smallest transmission bandwidth ratio among the plurality of light transmission units, as the changeover target (Target) downstream wavelength, and the wavelength change instruction unit may determine an upstream wavelength received by a light reception unit having a smallest reception bandwidth ratio among the plurality of light reception units, as the changeover target (Target) upstream wavelength.

Furthermore, a wavelength changeover method according to the present invention is executed by a station-side device, the station-side device performing transmission and reception of optical signals with respect to a plurality of subscriber-side devices, by wavelength division multiplexing and time division multiplexing, and the method includes:

a wavelength change instruction step of: generating a downstream wavelength changeover instruction message in a case where a wavelength assigned to the subscriber-side device, to which a downstream wavelength of a downstream signal transmitted from the station-side device has been assigned, is to be changed from a currently used (Source) downstream wavelength transmitted from the station-side device, to a changeover target (Target) downstream wavelength, the changeover target (Target) downstream wavelength being different from the downstream wavelength, the downstream wavelength changeover instruction message indicating the changeover target (Target) downstream wavelength; and generating an upstream wavelength changeover instruction message in a case where a wavelength assigned to the subscriber-side device, to which an upstream wavelength of an upstream signal received by the station-side device has been assigned, is to be changed from a currently used (Source) upstream wavelength received by the station-side device, to a changeover target (Target) upstream wavelength, the changeover target (Target) upstream wavelength being different from the currently used (Source) upstream wavelength, the upstream wavelength changeover instruction message indicating the changeover target (Target) upstream wavelength, in the wavelength change instruction step, the downstream wavelength changeover instruction message and the upstream wavelength changeover instruction message are independently generated, and only the wavelength for which the wavelength changeover instruction message is generated is changed.

The wavelength changeover method according to according to the present invention, before the wavelength change instruction step, may further include:

a state monitoring step of: monitoring a transmission bandwidth ratio, each of a plurality of light transmission units within the station-side device transmitting a downstream signal to one or more subscriber-side devices using a predetermined downstream wavelength, the transmission bandwidth ratio being a ratio of a total bandwidth transmitted by the light transmission unit to the one or more subscriber-side devices, to a bandwidth that the light transmission unit is capable of transmitting; and monitoring a reception bandwidth ratio, each of a plurality of light reception units within the station-side device receiving an upstream signal from one or more subscriber-side devices using a predetermined upstream wavelength, the reception bandwidth ratio being a ratio of a total bandwidth received by the light reception unit from the one or more subscriber-side devices, to a bandwidth that the light reception unit is capable of receiving, in the wavelength change instruction step, in a case where an increase in the transmission bandwidth ratio becomes a predetermined value or more within a previously determined predetermined time period, a wavelength assigned to the subscriber-side device, to which a downstream wavelength transmitted by the light transmission unit whose increase becomes the predetermined value or more has been assigned, is changed from a currently used (Source) downstream wavelength transmitted by the light transmission unit, to a changeover target (Target) downstream wavelength that is different from the currently used (Source) downstream wavelength, and in a case where an increase in the reception bandwidth ratio becomes a predetermined value or more within a previously determined predetermined time period, a wavelength assigned to the subscriber-side device, to which an upstream wavelength received by the light reception unit whose increase become the predetermined value or more has been assigned, is changed from a currently used (Source) upstream wavelength received by the light reception unit, to a changeover target (Target) upstream wavelength that is different from the currently used (Source) upstream wavelength.

Each invention described above may be combined to the greatest extent possible.

Effect of the Invention

In the wavelength tunable WDM/TDM-PON system according to the present invention, it is possible to individually improve upstream and downstream band utilization efficiency according to the respective traffic volumes of upstream and downstream signals.

BRIEF DESCRIPTION OF THE DRAWINGS

FIG. 13 shows an example of a table managed by a DWBA unit 57 in the second embodiment.

EMBODIMENTS FOR CARRYING OUT THE INVENTION

Figure 1:
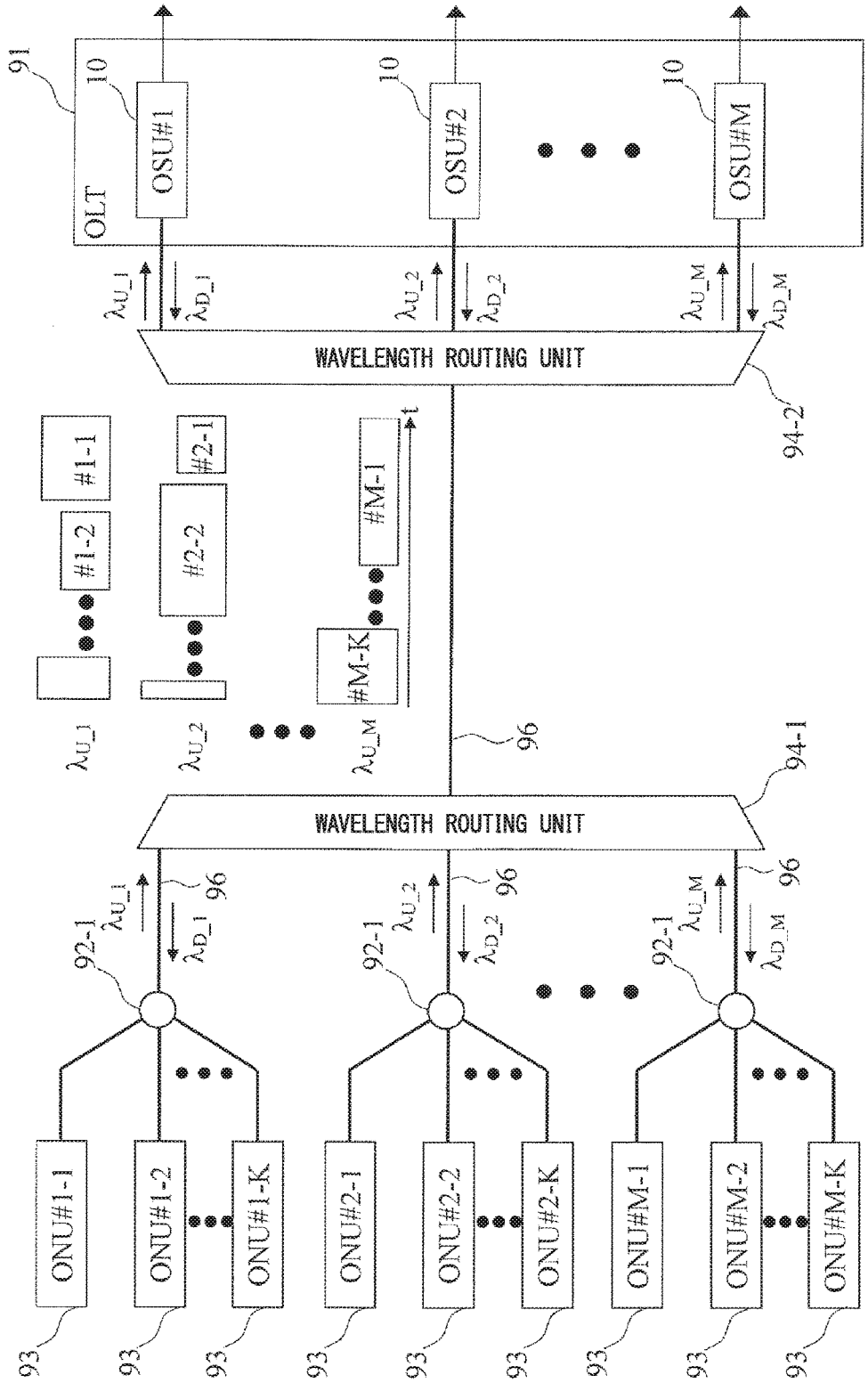
FIG. 1 shows a configuration example of a WDM/TDM-PON system related to the present invention.
Figure 2:
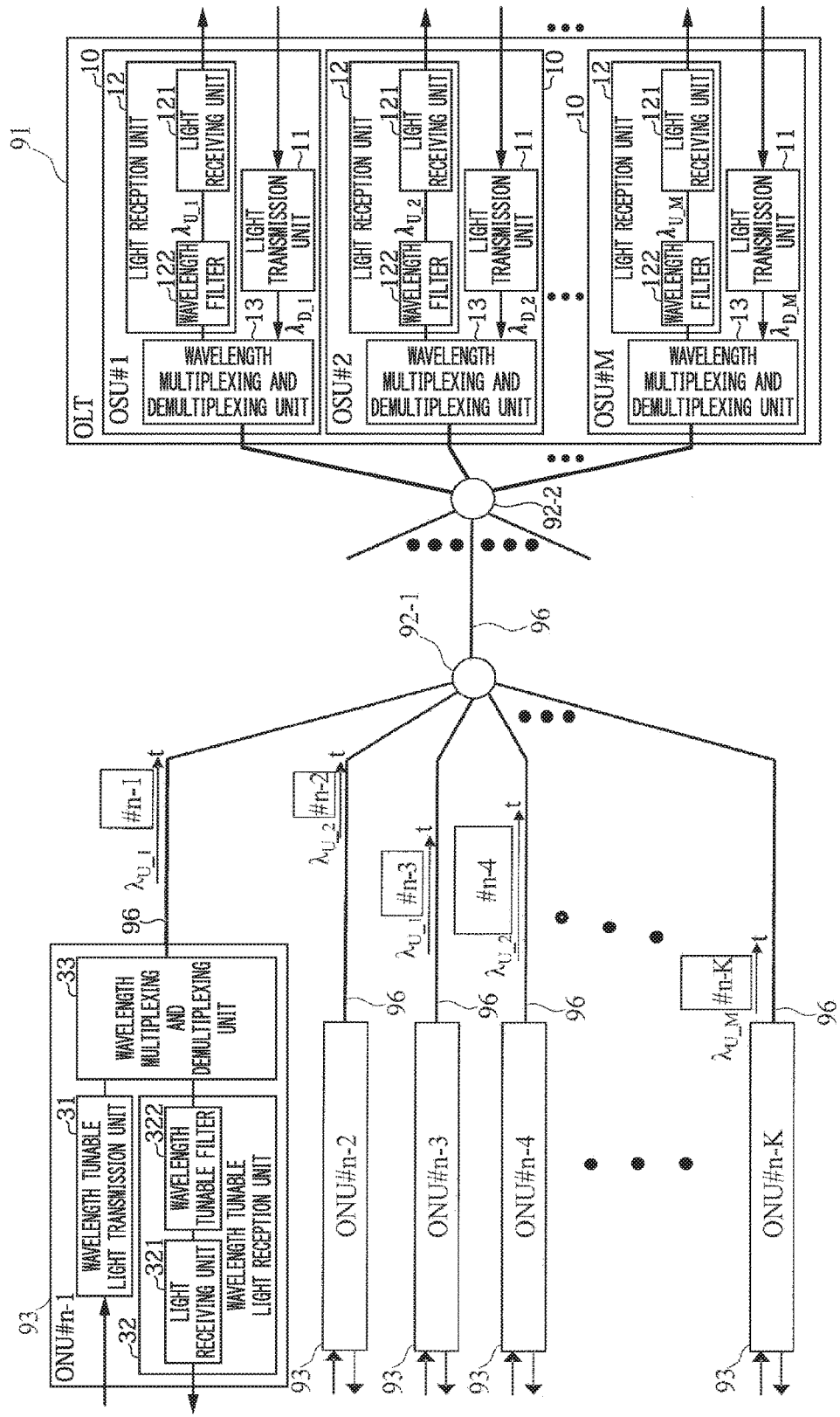
FIG. 2 shows a configuration example of a wavelength tunable WDM/TDM-PON system related to the present invention.
Figure 3:
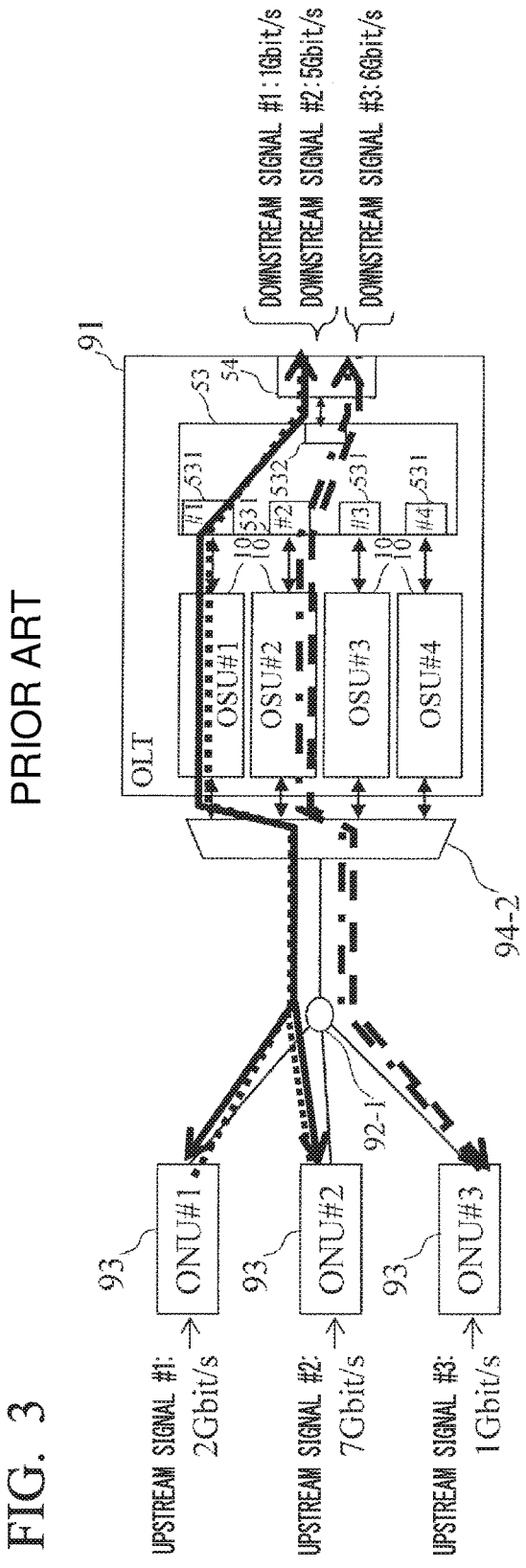
FIG. 3 shows an example before wavelength changeover in wavelength switching of an upstream/downstream wavelength pair related to the present invention.
Figure 4:
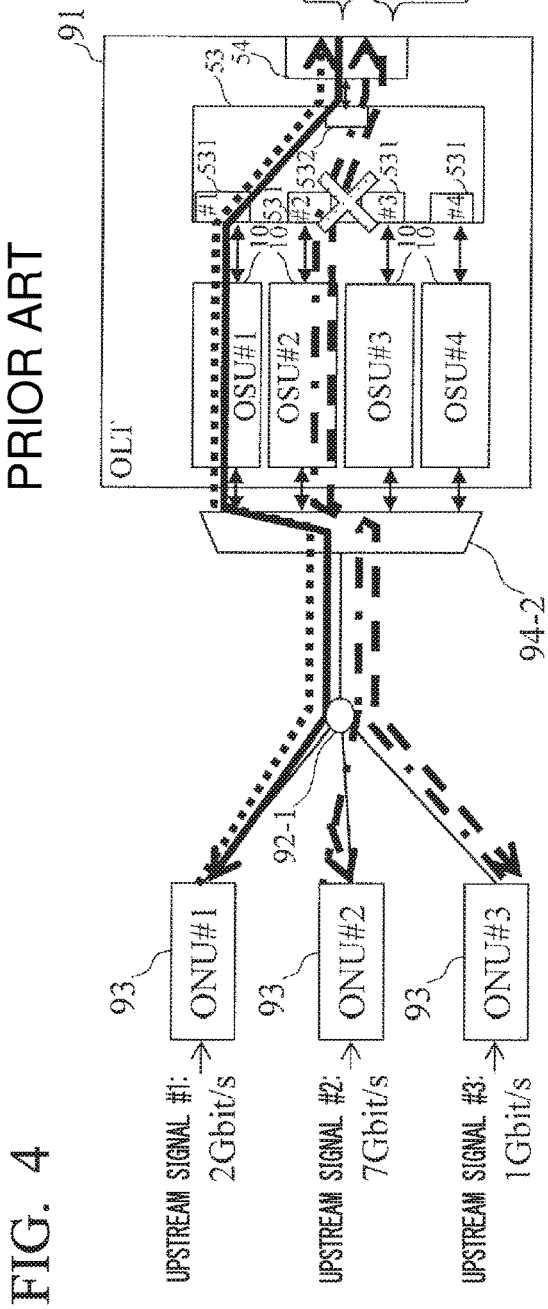
FIG. 4 shows an example after wavelength changeover in wavelength switching of the upstream/downstream wavelength pair related to the present invention.
Figure 5:
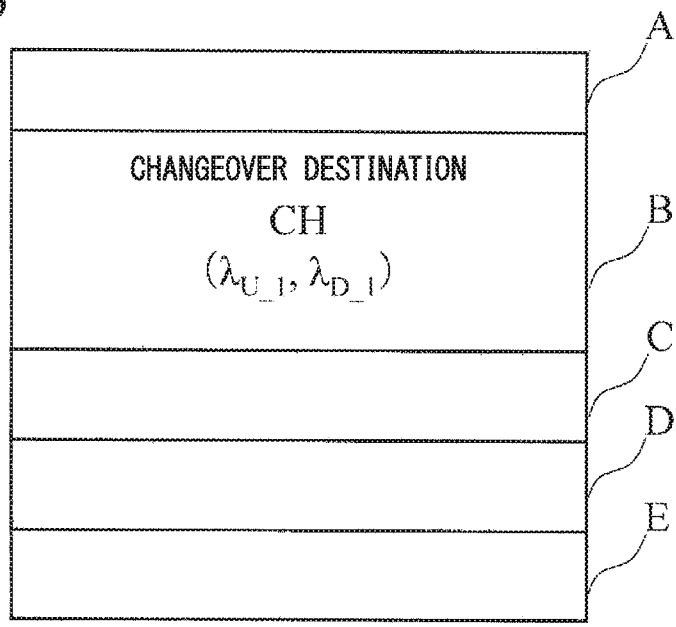
FIG. 5 shows an example of a wavelength changeover instruction signal related to the present invention.

Hereunder, embodiments of the present invention are described in detail with reference to the drawings. The present invention is in no way limited to the embodiments described below. The embodiments are illustrated merely as an example, and the present invention may be made by embodiments to which various modifications and improvements are performed based on the knowledge of those skilled in the art. In the present specification and in the drawings, the same reference symbols mutually denote the same elements.

First Embodiment

Figure 6:
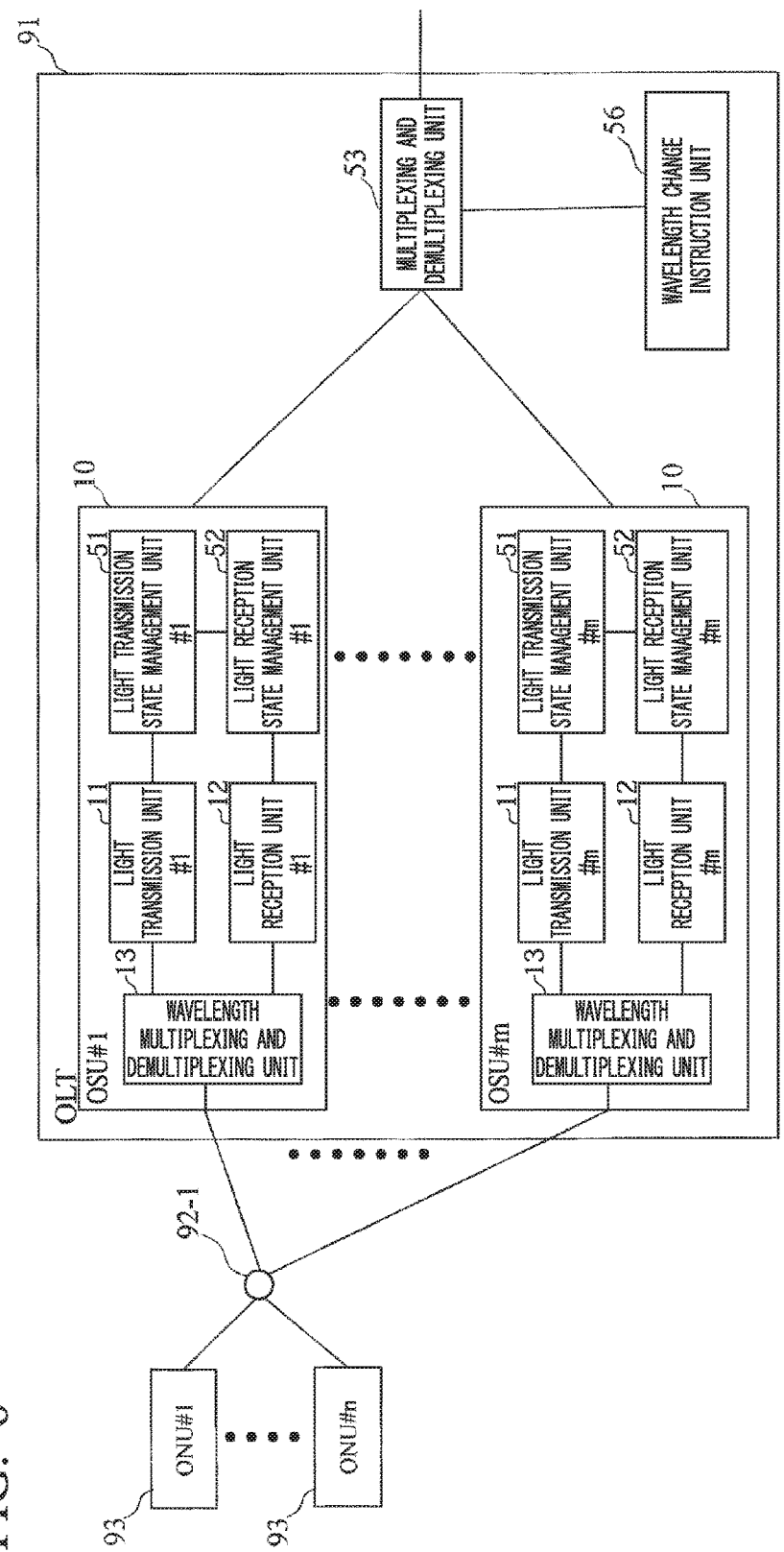
FIG. 6 shows an example of an optical communication system according to a first embodiment.

FIG. 6 shows an example of an optical communication system according to the present embodiment.

The optical communication system according to the present embodiment includes a plurality of ONUs 93 that function as a plurality of subscriber-side devices, and an OLT 91 that functions as a station-side device.

The optical communication system according to the present embodiment is a wavelength tunable WDM/TDM-PON system, and the plurality of ONUs 93 and the OLT 91 perform transmission and reception of optical signals by wavelength division multiplexing (WDM) and time division multiplexing (TDM).

The OLT 91 includes OSUs 10 #1 to #m, a multiplexing and demultiplexing unit 53, and a wavelength change instruction unit 56. Each OSU 10 includes a light transmission unit 11, a light reception unit 12, a wavelength multiplexing and demultiplexing unit 13, a light reception state management unit 52 that functions as a light reception state monitoring unit, and a light transmission state management unit 51 that functions as a light transmission state monitoring unit.

The OSUs 10 #1 to #m transmit and receive with respect to the ONU 93, optical signals of wavelengths that are predetermined for each OSU 10. That is to say, the wavelengths of the signals transmitted and received by the light transmission unit 11 and the light reception unit 12 are predetermined for each OSU 10.

For example, the light reception unit 12 #1 receives an upstream signal transmitted from the ONU 93 having an upstream wavelength $\lambda_{U\_1}$. Furthermore, the light transmission unit 11 #1 transmits a downstream signal to one or more ONUs 93 using a predetermined downstream wavelength $\lambda_{D\_1}$.

The wavelength multiplexing and demultiplexing unit 13 multiplexes and demultiplexes the upstream signals and the downstream signals.

The multiplexing and demultiplexing unit 53 multiplexes the upstream signals from the light receiving units 12 and transmits them to an upper network, and demultiplexes the downstream signals received from the upper network and transmits them to the OSUs 10.

The light transmission state management unit 51 monitors a transmission bandwidth ratio of each light transmission unit 11. The transmission bandwidth ratio is, for example, a ratio of the total bandwidth used by the light transmission unit 11, to the bandwidth that the light transmission unit 11 can transmit at a predetermined time.

The total bandwidth used by the light transmission unit 11 represents, for example, if the OSU 10 #1 has been assigned to the ONUs 93 #1 and 93 #4, the bandwidth used by the OSU 10 #1, which is a sum of the bandwidth allocated to the ONU 93 #1 and the bandwidth allocated to the ONU 93 #4.

The light reception state management unit 52 monitors a reception bandwidth ratio of each light reception unit 12. The reception bandwidth ratio is, for example, a ratio of the total bandwidth used by the light reception unit 12, to the bandwidth that the light reception unit 12 can receive at a predetermined time. The interpretation of the total bandwidth used by the light receiving unit 12 is the same as the total bandwidth used by the light transmission unit 11.

The wavelength change instruction unit 56 individually performs a wavelength change instruction of an upstream wavelength and a downstream wavelength with respect to the ONU 93. For example, the wavelength change instruction unit 56 uses a wavelength changeover instruction message to instruct the ONU 93 #1 to change the upstream wavelength from the wavelength $\lambda_{U\_1}$ to the wavelength $\lambda_{U\_2}$.

At this time, the wavelength change instruction unit 56 changes the wavelength when the transmission bandwidth ratio monitored by the light transmission state management unit 51 reaches a predetermined condition, or the reception bandwidth ratio monitored by the light reception state management unit 52 reaches a predetermined condition.

The predetermined condition is for example, such that the upstream wavelength is changed when an increase in the reception bandwidth ratio becomes a predetermined value or more within a predetermined time period, and the downstream wavelength is changed when an increase in the transmission bandwidth ratio is a predetermined value or more within a predetermined time period.

The wavelength change instruction unit 56 preferably determines the changeover target (Target) wavelength (wavelength after the change) based on the transmission bandwidth ratio monitored by the light transmission state management unit 51 and the reception bandwidth ratio monitored by the light reception state management unit 52. For example, a wavelength having the smallest transmission bandwidth ratio among the selectable upstream wavelengths is determined as the changeover target (Target) upstream wavelength, and a wavelength having the smallest reception bandwidth ratio among the selectable downstream wavelengths is determined as the changeover target (Target) upstream wavelength.

Figure 7:
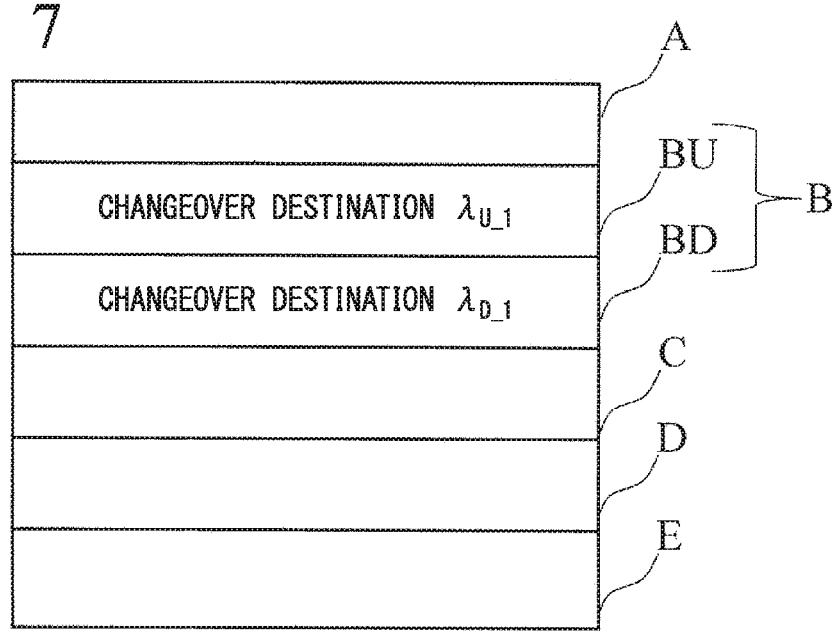
FIG. 7 shows an example of a wavelength changeover instruction signal according to the first embodiment.

The wavelength change instruction unit 56 also performs the wavelength change instruction described above using an arbitrary control frame used in the optical communication system. FIG. 7 shows an example of a control frame.

The changeover target (Target) upstream wavelength and downstream wavelength are instructed using a wavelength changeover instruction message region 13 of the control frame. For example, in the wavelength changeover instruction message region B, the upstream wavelength $\lambda_{U\_1}$ is instructed in a region BU and the downstream wavelength $\lambda_{D\_1}$ is instructed in a region BD.

When the wavelength change instruction unit 56 changes only the upstream wavelength, it instructs the changeover target (Target) wavelength as the upstream wavelength, and the currently used (Source) downstream wavelength as the downstream wavelength. When the wavelength change instruction unit 56 changes only the downstream wavelength, it instructs the changeover target (Target) wavelength as the downstream wavelength, and the currently used (Source) upstream wavelength as the upstream wavelength. Consequently, in the optical communication system according to the present embodiment, it is possible to separately instruct the upstream wavelength and the downstream wavelength, and load distribution can be separately performed for the upstream signal and the downstream signal.

Figure 8:
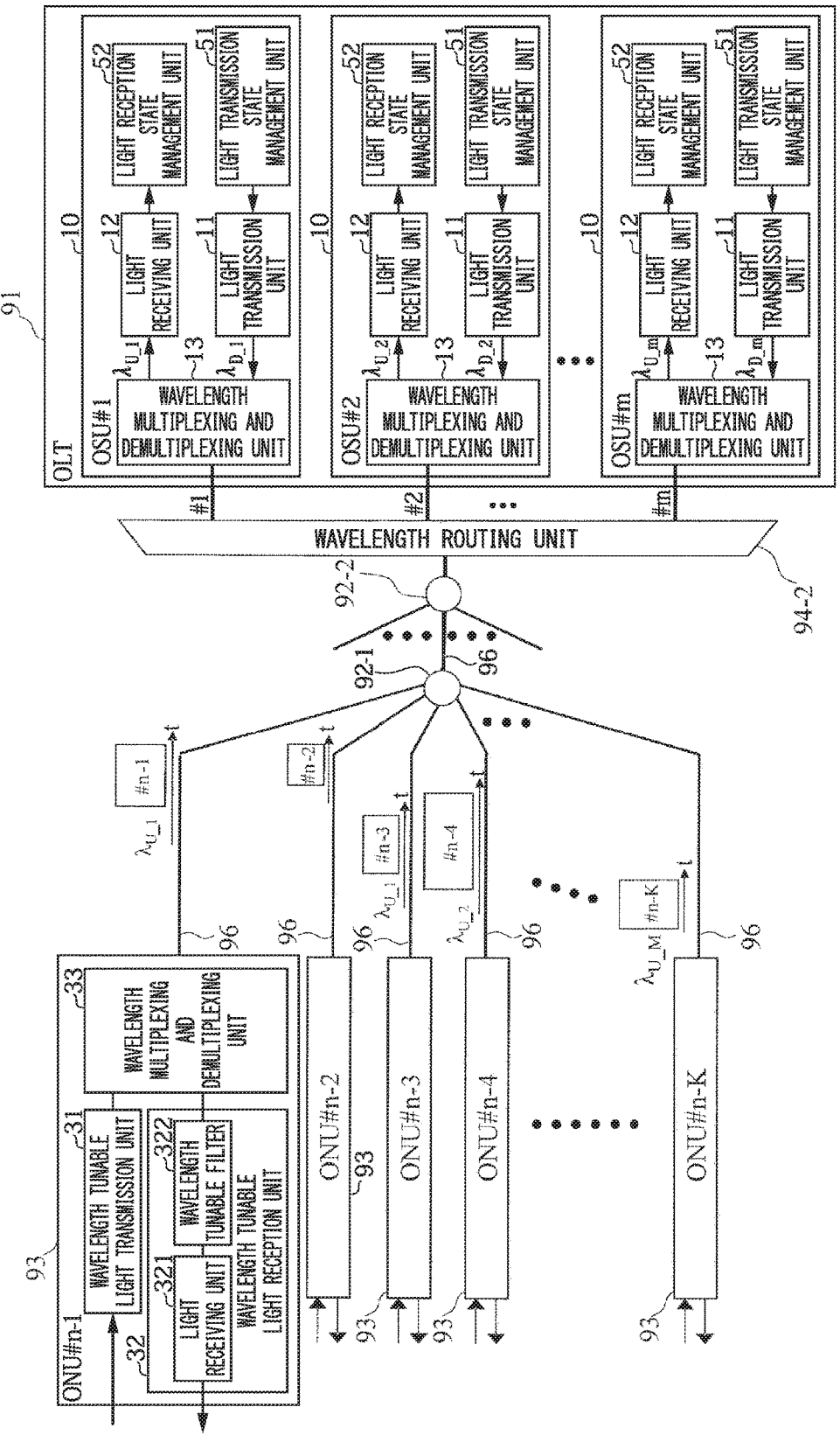
FIG. 8 shows a configuration example of a wavelength tunable WDM/TDM-PON system according to the first embodiment.

FIG. 8 shows another example of an optical communication system according to the present embodiment. In FIG. 8, an optical multiplexing and demultiplexing unit 92-2 and a wavelength routing unit 94-2 are arranged between the optical multiplexing and demultiplexing unit 92-1 and the OLT 91. The other configurations are the same as those in FIG. 6.

Figure 9:
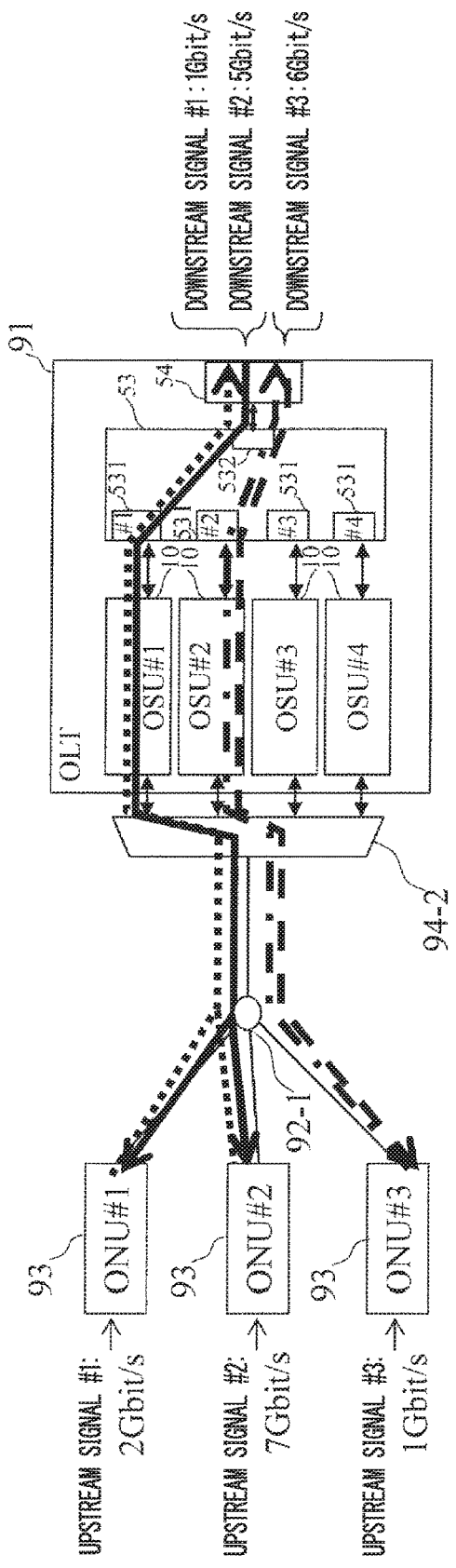
FIG. 9 shows an example before wavelength changeover in wavelength changeover according to the first embodiment.

FIG. 9 shows an example of wavelength assignment in the optical communication system according to the present embodiment. In the present figure, the optical multiplexing and demultiplexing unit 92-2 described above is omitted. Furthermore, reference symbols 531 and 532 represent input and output ports of the multiplexing and demultiplexing unit 53. Moreover, reference symbol 54 represents a SNI (Service Node Interface) which is an interface connected to the upper network side.

In FIG. 9, a total bandwidth of 6 Gbit/s is used for the OSU 10 #1 for a downstream signal #1 and a downstream signal #2. Among these, the downstream signal #2 uses a bandwidth of 5 Gbit/s. In this manner, a plurality of ONUs 93 #1 and 93 #2 are assigned to a single light transmission unit 11 #1 (in the OSU 10 #1).

Furthermore, for the upstream signal, the ONU 93 #1 uses a bandwidth of 2 Gbit/s by using the OSU 10 #1 by means of an upstream signal #1. In addition, the ONU 93 #2 uses a bandwidth of 7 Gbit/s by utilizing the OSU 10 #1 by means of an upstream signal #2. The ONU 93 #3 uses a bandwidth of 1 Gbit/s by utilizing the OSU 10 #2 by means of an upstream signal #3.

In this manner, similarly for the upstream signal, a plurality of ONUs 93 #1 and 93 #2 are assigned to a single light receiving unit 12 #1 (in the OSU 10 #1).

The maximum bandwidth of a single OSU 10 is assumed to be 10 Gbit/s. In this case, the used upstream bandwidth in the OSU 10 #1 is likely to exceed 9 Gbit/s (due to the upstream signals #1 and #2 described above). Consequently, in the present embodiment, as shown in FIG. 10, a wavelength change instruction is performed such that only the upstream signal #2 of the ONU 93 #2 (equivalent to 7 Gbit/s) utilizes the OSU 10 #2.

However, the downstream signal #2 of the ONU 93 #2 (equivalent to 5 Gbit/s) continues to utilize the OSU 10 #1.

Figure 10:
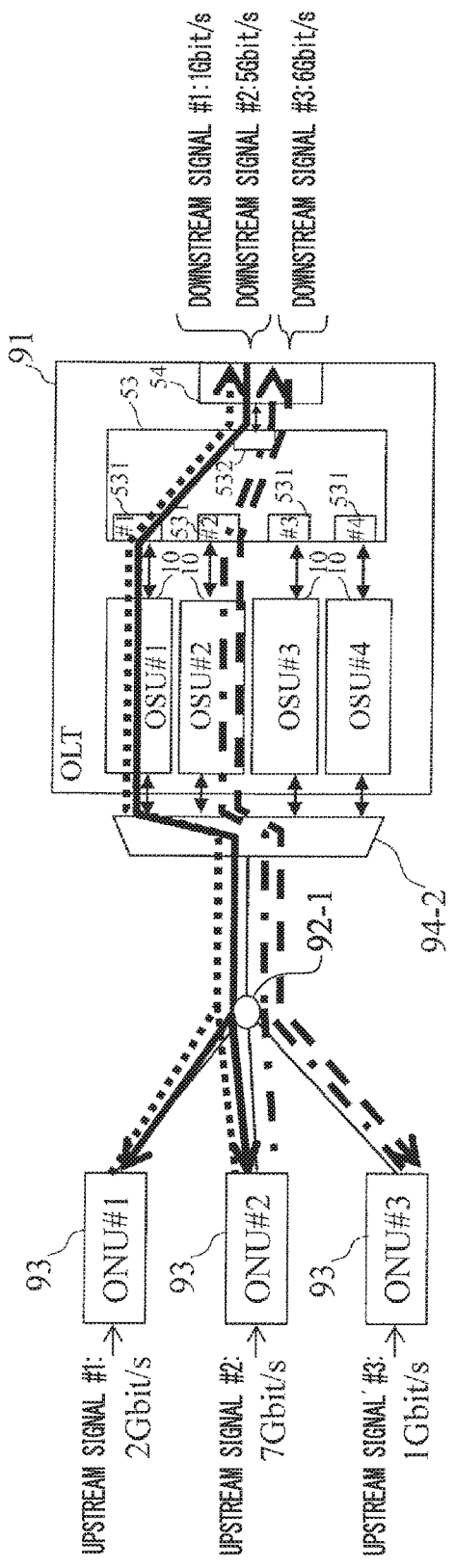
FIG. 10 shows an example after wavelength changeover in wavelength changeover according to the first embodiment.

Therefore, as shown in FIG. 10, it is possible to perform load distribution with respect to the upstream and the downstream.

Furthermore, as shown in FIG. 7, the wavelength change instruction unit 56 separately adds a wavelength change instruction BU of the upstream wavelength and a wavelength change instruction BD of the downstream wavelength in the wavelength changeover instruction message region B. If only the upstream wavelength is to be changed, it instructs a changeover target (Target) wavelength as the upstream wavelength, and the currently used (Source) downstream wavelength as the downstream wavelength. If only the downstream wavelength is to be changed, it instructs the changeover target (Target) wavelength as the downstream wavelength, and the currently used (Source) upstream wavelength as the upstream wavelength.

In the present embodiment, as mentioned above, the wavelength change instruction unit 56 can separately instruct the upstream wavelength and the downstream wavelength. Furthermore, the wavelength change instruction according to the present invention can be performed by changing only the format of the wavelength change instruction message in the control frame in the structure of the wavelength change instruction related to the present invention, which allows a wavelength change of only one of the upstream wavelength and the downstream wavelength.

Figure 11:
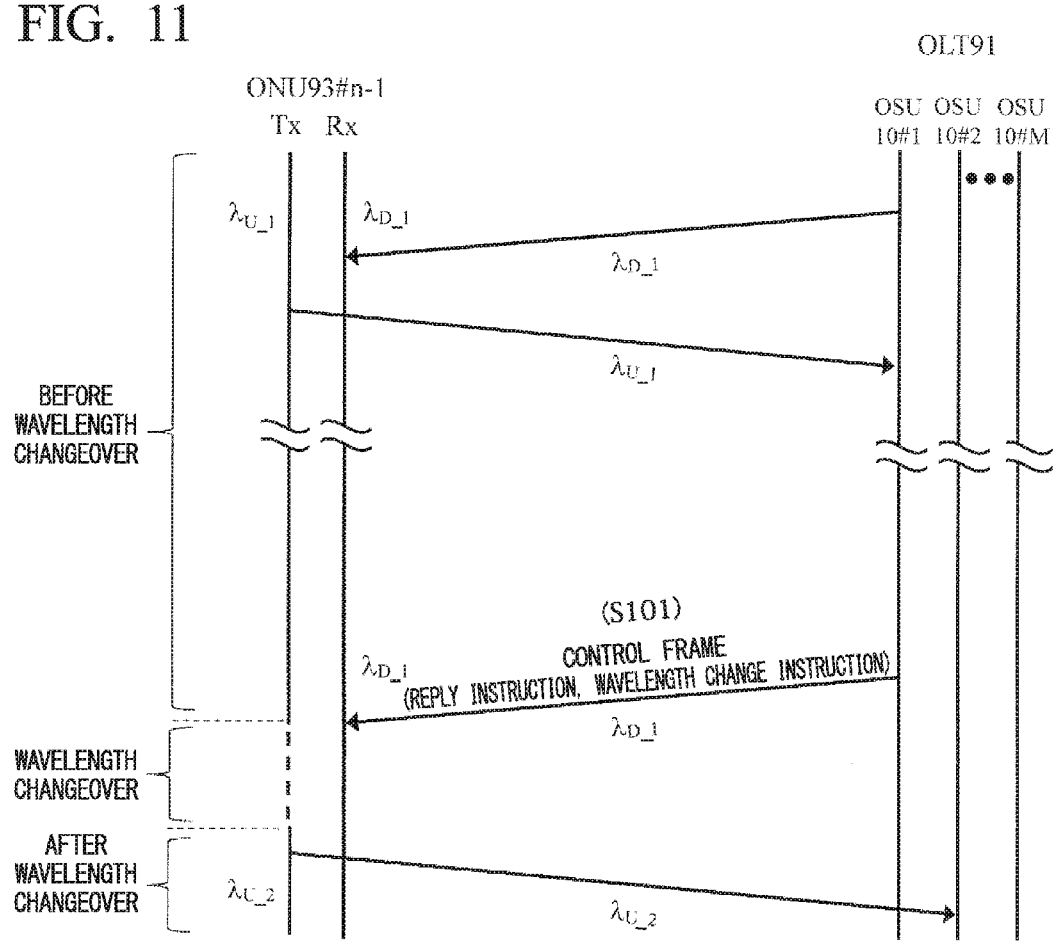
FIG. 11 shows an example of a changeover of only the upstream signal wavelength in the first embodiment.

FIG. 11 shows an example of a wavelength changeover sequence according to the present embodiment. The wavelength changeover method according to the present embodiment is a wavelength changeover method executed by the OLT 91, which is connected to one or more ONUs 93, and executes a state monitoring procedure and a wavelength change instruction procedure.

In FIG. 11, Tx of the ONU 93 #n−1 is an optical signal transmitted by the ONU 93 #n−1, and Rx of the ONU 93 #n−1 is an optical signal received by the ONU 93 #n−1.

Before wavelength changeover, the OSU 10 #1 and the ONU 93 #n−1 communicate using an upstream wavelength $\lambda_{U\_1}$ and a downstream wavelength $\lambda_{D\_1}$. At this time, the light transmission state management unit 51 and the light reception state management unit 52 execute the state monitoring procedure described above.

In the state monitoring procedure, the light transmission state management unit 51 monitors a transmission bandwidth ratio of the light transmission unit 11, and the light reception state management unit 52 monitors a reception bandwidth ratio of the light reception unit 12.

Meanwhile, when the transmission bandwidth ratio monitored by the light transmission state management unit 51 reaches a predetermined condition, or when the reception bandwidth ratio monitored by the light reception state management unit 52 reaches a predetermined condition, the wavelength change instruction procedure described above is executed.

In the wavelength change instruction procedure, the wavelength change instruction unit 56 changes a wavelength to be assigned to the ONU 93, to which an upstream wavelength received by the light reception unit 12 has been assigned, from the currently used (Source) upstream wavelength, to the changeover target (Target) upstream wavelength. At this time, the OSU 10 #1 transmits a control frame including a reply instruction and a wavelength change instruction to the ONU 93 #n−1 with the downstream wavelength $\lambda_{D\_1}$ (S101). In the wavelength change instruction, the changeover target (Target) wavelength $\lambda_{U\_2}$ is listed as the upstream wavelength, and the currently used (Source) downstream wavelength $\lambda_{D\_1}$ is listed as the downstream wavelength.

When the ONU 93 #n−1 receives the control frame, it performs a wavelength changeover that changes the upstream wavelength from $\lambda_{D\_1}$ to $\lambda_{D\_2}$. At this time, since the downstream wavelength is still the currently used (Source) downstream wavelength $\lambda_{D\_1}$, a wavelength changeover of the downstream wavelength is not performed. Consequently, in the manner of the sequence diagram of FIG. 11, it is possible to change only the wavelength of the upstream signal of the OLT 91 from $\lambda_{D\_1}$, which has been assigned to the OSU 10 #1, to $\lambda_{D\_2}$, which has been assigned to the OSU 10 #2.

Second Embodiment

Figure 12:
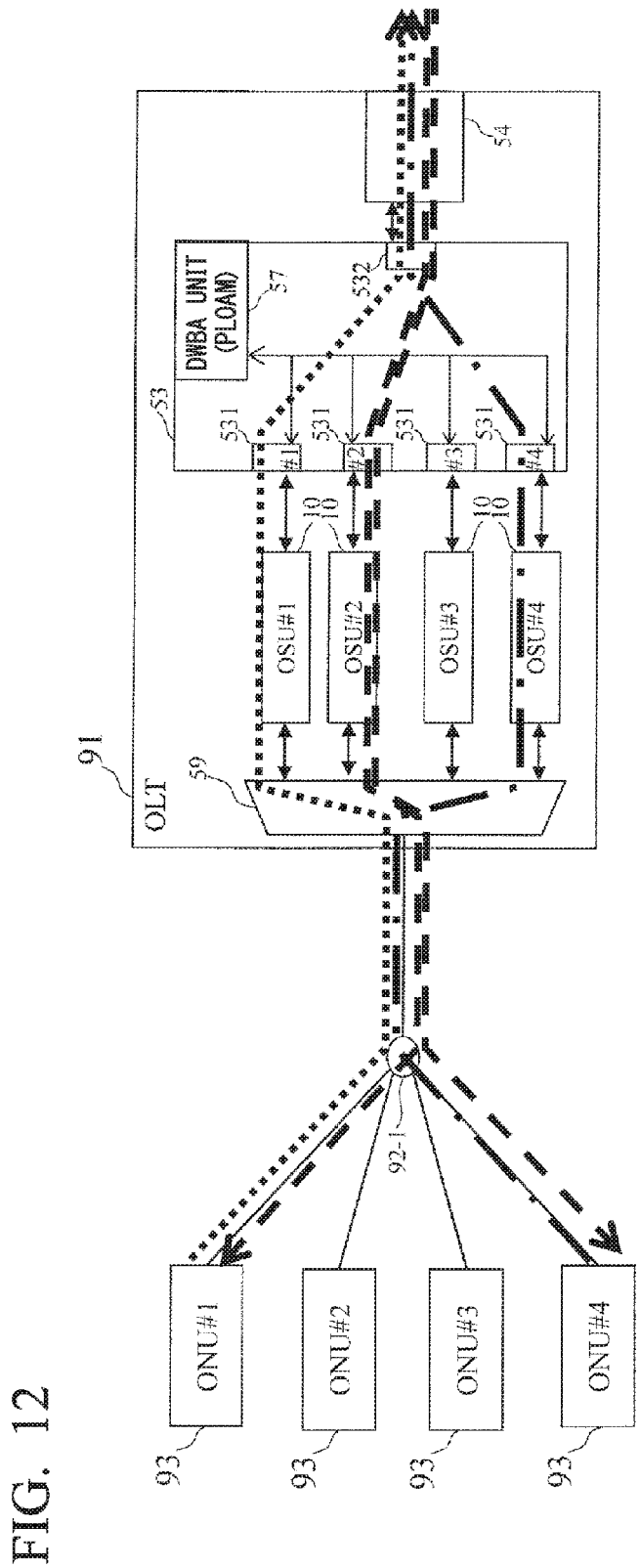
FIG. 12 shows an example of an independent changeover of upstream and downstream wavelengths according to a second embodiment.

FIG. 12 shows an example of an optical communication system according to the present embodiment.

In the optical communication system according to the present embodiment, the OLT 91 includes a wavelength routing unit 59 instead of the wavelength routing unit 94-2 shown in FIG. 9. Furthermore, the OLT 91 according to the present embodiment includes a DWBA (Dynamic Wavelength and Bandwidth Allocation) unit 57 in the multiplexing and demultiplexing unit 53 which observes and controls a traffic state of all of the OSUs 10.

The OSU 10 according to the present embodiment includes, in the same manner as the configuration shown in FIG. 6, a light transmission unit 11, a light reception unit 12, a light transmission state management unit 51, and a light reception state management unit 52.

The light reception state management unit 52 according to the present embodiment monitors a reception bandwidth ratio between the receivable bandwidth of the light reception unit 12 and the total bandwidth being used, for each upstream wavelength. Furthermore, the light transmission state management unit 51 according to the present embodiment monitors a transmission bandwidth ratio between the transmittable bandwidth of the light transmission unit 11 and the total bandwidth being used, for each downstream wavelength used by the OSU 10.

The DWBA unit 57 includes the function of the wavelength change instruction unit 56 shown in FIG. 6, and based on a predetermined condition using the reception bandwidth ratio and the transmission band ratio described above, dynamically assigns an upstream wavelength and downstream wavelength, which each represent potential change targets, of the change target ONUs 93, and performs instruction with respect to the ONUs 93.

The instructions with respect to the ONUs 93 uses, for example, a PLOAM (Physical Layer Operations Administration and Maintenance) message. As a result of the DWBA unit 57 dynamically changing the timing of the wavelength change autonomously, the optical communication system according to the present embodiment can perform dynamic load distribution.

FIG. 13 shows an example of an upstream wavelength and a downstream wavelength assigned by the DWBA unit 57.

Here, the OSU 10 #1 and the SNI 54 #1 are assigned to the upstream signal of the ONU 93 #1. The OSU 10 #2 and the SNI 54 #1 are assigned to the downstream signal of the ONU 93 #1. The OSU 10 #4 and the SNI 54 #1 are assigned to the upstream signal of the ONU 93 #4. The OSU 10 #2 and the SNI 54 #1 are assigned to the downstream signal of the ONU 93 #4.

Here, in the plurality of OSUs 10 that connect to the plurality of ONUs 93 and output signals of mutually different wavelengths, a light reception state management unit 52 may be mounted for each light reception unit 12, and a light transmission state management unit 51 may be mounted for each light transmission unit 11.

Furthermore, a single light transmission state management unit 51 may be shared by a plurality of OSUs 10, and a single light reception state management unit 52 may be shared by a plurality of OSUs 10. In this case, signals from a plurality of OSUs 10 are drawn into the shared light transmission state management unit 51 or light reception state management unit 52 provided inside the LT 91. Then, the common light transmission state management unit 51 provided inside the OLT 91 monitors the plurality of light transmission units 11 for each light transmission unit 11 individually. Also, the common light reception state management unit 52 provided inside the OLT 91 monitors the plurality of light reception units 12 for each light reception unit 12 individually.

The predetermined condition for the DWBA unit 57 to change a wavelength may be made a case satisfying at least one of: a case where the reception bandwidth ratio for each wavelength in the light reception state management unit 52 becomes a predetermined value or more; or a case where the transmission bandwidth ratio for each wavelength in the light transmission state management unit 51 becomes a predetermined value or more. In this manner, it is possible to change the upstream wavelength and the downstream wavelength respectively to the wavelength with the smallest reception bandwidth ratio and the wavelength with the smallest transmission bandwidth ratio. Furthermore, when an excess or deficiency in the bandwidth is expected, it is possible to support the bandwidth requested by the ONU 93 by minimal wavelength changes.

Third Embodiment

Figure 14:
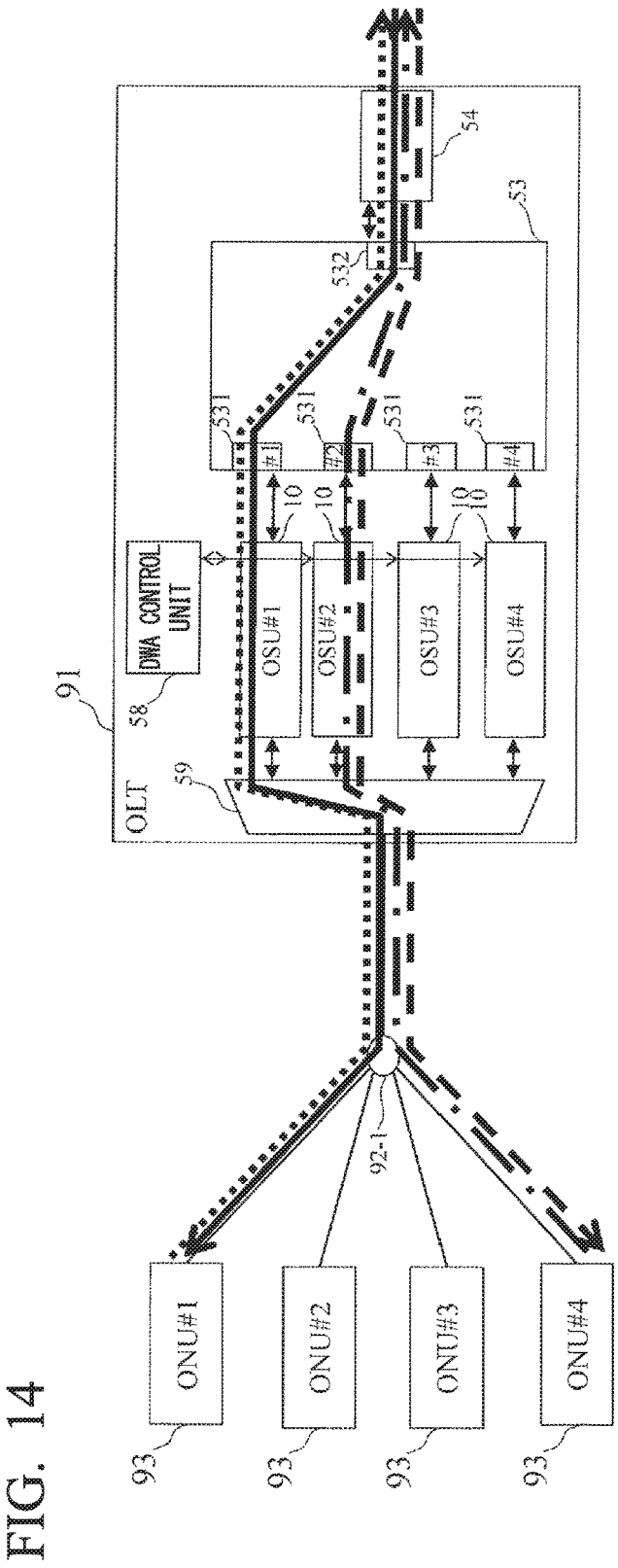
FIG. 14 shows an example of a cooperative changeover of upstream and downstream wavelengths according to a third embodiment.

FIG. 14 shows an example of an optical communication system according to the present embodiment.

In the optical communication system according to the present embodiment, in the same manner as the second embodiment described above, the OLT 91 includes a wavelength routing unit 59 instead of the wavelength routing unit 94-2 shown in FIG. 9.

Furthermore, in the present embodiment, compared to the second embodiment described above, where the DWBA unit 57 is included in the multiplexing and demultiplexing unit 53, a DWA (Dynamic Wavelength Allocation) control unit 58 is included in the OLT 91 described above independently of the multiplexing and demultiplexing unit 53.

Here, the DWBA in the second embodiment is a function that possesses both DWA and DBA (Dynamic Bandwidth Allocation).

In the case of the present embodiment, the DWA control unit 58 is responsible for DWA (dynamic assignment control of wavelength switching) among the DWBA functions mentioned above. Further, DBA is a function that, based on a predetermined condition, dynamically assigns a reception bandwidth and a transmission bandwidth that becomes a change target of an ONU 93 to which the upstream wavelength and the downstream wavelength are assigned.

In the present embodiment, DBA is not performed within the multiplexing and demultiplexing unit 53 in the manner of the second embodiment described above, and is performed individually for each OSU 10. In this case, each OSU 10 may be responsible for the DBA function, or the DWA control unit 58 described above may be responsible for the DBA function.

The OSU 10 according to the present embodiment includes, in the same manner as the configuration shown in FIG. 6, a light transmission unit 11, a light reception unit 12, a light transmission state management unit 51, and a light reception state management unit 52.

The light reception state management unit 52 according to the present embodiment monitors a reception bandwidth ratio between the receivable bandwidth of the light reception unit 12 and the total bandwidth being used, for each upstream wavelength. The light transmission state management unit 51 according to the present embodiment monitors a transmission bandwidth ratio between the transmittable bandwidth of the light transmission unit 11 and the total bandwidth being used, for each downstream wavelength used by the OSU 10.

The DWA control unit 58 includes the function of the wavelength change instruction unit 56 described above, and dynamically assigns a change target upstream wavelength and downstream wavelength of the change target ONUs 93, and performs instruction with respect to the ONUs 93. Furthermore, the DWA control unit 58 obtains a reception bandwidth ratio and a transmission bandwidth ratio of each OSU 10 from the DBA function mentioned above, and selects the change target ONUs 93 based on a predetermined condition using the same, and performs instruction with respect to the ONUs 93.

The instruction to each ONU 93, for example, may use a PLOAM message transmitted by each OSU 10 to the ONU 93, or it may use a Gate frame which is a type of protocol called a MPCP (Multi-Point Control Protocol). As a result of the DWA control unit 58 dynamically changing the timing of the wavelength change autonomously, the optical communication system according to the present embodiment can perform dynamic load distribution. Furthermore, the upstream wavelength and the downstream wavelength assigned by the DWA control unit 58 are the same as for the assignment of the upstream wavelength and the downstream wavelength in the second embodiment illustrated in FIG. 13.

Here, in the plurality of OSUs 10 that connect to the plurality of ONUs 93 and output signals of mutually different wavelengths, a light reception state management unit 52 may be mounted for each light reception section 12, and a light transmission state management unit 51 may be mounted for each light transmission unit 11. Furthermore, a single light transmission state management unit 51 may be shared by a plurality of OSUs 10, and a single light reception state management unit 52 may be shared by a plurality of OSUs 10.

As described above, since the optical communication system according to the present embodiment includes the light reception state management unit 52 and the light transmission state management unit 51, when the increase in either the reception bandwidth ratio or the transmission bandwidth ratio within a predetermined time period is a predetermined value or more, change to a wavelength with the smallest reception bandwidth ratio and to a wavelength with the smallest transmission band ratio can be respectively performed. Therefore, when an excess or deficiency in the bandwidth is expected, it is possible to change the wavelength beforehand in anticipation of subsequent fluctuations.

INDUSTRIAL APPLICABILITY

The present invention may be applied to the information communication industry.

REFERENCE SYMBOLS

10 OSU
11 Light transmission unit
12 Light reception unit
13 Wavelength multiplexing and demultiplexing unit
31 Wavelength tunable light transmission unit
32 Wavelength tunable light reception unit
33 Wavelength multiplexing and demultiplexing unit
51 Light transmission state management unit
52 Light reception state management unit
53 Multiplexing and demultiplexing unit
54 SNI
56 Wavelength change instruction unit
57 DWBA unit
58 DWA control unit
59 Wavelength routing unit
91 OLT
92-1, 92-2 Optical multiplexing and demultiplexing unit
93 ONU
94-1, 94-2 Wavelength routing unit
96 Optical fiber transmission line
121 Light receiving unit
122 Wavelength filter
321 Light receiving unit
322 Wavelength tunable filter
531, 532 Port

The invention claimed is:

1. A station-side device that performs transmission and reception of optical signals with respect to one or more subscriber-side devices including a first subscriber-side device, by wavelength division multiplexing and time division multiplexing, the station-side device comprising:
a plurality of light transmission units including a first light transmission unit, each of the light transmission units transmitting a downstream signal to the one or more subscriber-side devices using a predetermined downstream wavelength;
a plurality of light reception units including a first light reception unit, each of the light reception units receiving an upstream signal from the one or more subscriber-side devices using a predetermined upstream wavelength;
a wavelength change instruction unit that generates a downstream wavelength changeover instruction message in a case where a downstream wavelength assigned to the first subscriber-side device, to which a downstream wavelength of a downstream signal transmitted by the first light transmission unit has been assigned, is to be changed from a currently used (Source) downstream wavelength transmitted by the first light transmission unit, to a changeover target (Target) downstream wavelength, the changeover target (Target) downstream wavelength being different from the currently used (Source) downstream wavelength, the downstream wavelength changeover instruction message indicating the changeover target (Target) downstream wavelength, the wavelength change instruction unit generating an upstream wavelength changeover instruction message in a case where an upstream wavelength assigned to the first subscriber-side device, to which an upstream wavelength of an upstream signal received by the first light reception unit has been assigned, is to be changed from a currently used (Source) upstream wavelength received by the first light reception unit, to a changeover target (Target) upstream wavelength, the changeover target (Target) upstream wavelength being different from the currently used (Source) upstream wavelength, the upstream wavelength changeover instruction message indicating the changeover target (Target) upstream wavelength,
wherein the wavelength change instruction unit independently generates the downstream wavelength changeover instruction message and the upstream wavelength changeover instruction message, only the downstream wavelength assigned to the first subscriber-side device is changed in a case where the wavelength change instruction unit has generated the downstream wavelength changeover instruction message, and only the upstream wavelength assigned to the first subscriber-side device is changed in a case where the wavelength change instruction unit has generated the upstream wavelength changeover instruction message;
a light transmission state monitoring unit that monitors a total transmission bandwidth that the first light transmission unit transmits to the one or more subscriber-side devices; and
a light reception state monitoring unit that monitors a total reception bandwidth that the first light reception unit receives from the one or more subscriber-side devices,
wherein in a case where the total reception bandwidth matches a predetermined condition, the wavelength change instruction unit changes the wavelength assigned to the first subscriber-side device, to which the upstream wavelength received by the first light reception unit whose total reception bandwidth is matched with the predetermined condition has been assigned, from the currently used (Source) upstream wavelength received by the first light reception unit, to the changeover target (Target) upstream wavelength that is different from the currently used (Source) upstream wavelength, and
in a case where the total transmission wavelength matches a predetermined condition, the wavelength change instruction unit changes the wavelength assigned to the first subscriber-side device, to which the downstream wavelength transmitted by the first light transmission unit whose total transmission wavelength is matched with the predetermined condition has been assigned, from the currently used (Source) downstream wavelength transmitted by the first light transmission unit, to the changeover target (Target) downstream wavelength that is different from the currently used (Source) downstream wavelength.

2. The station-side device according to claim 1, wherein a transmission bandwidth ratio is a ratio of a total bandwidth transmitted by one light transmission unit of the plurality of light transmission units to the one or more subscriber-side devices, to a bandwidth that the one light transmission unit is capable of transmitting,
a reception bandwidth ratio is a ratio of a total bandwidth received by one light reception unit of the plurality of light reception units from the one or more subscriber-side devices, to a bandwidth that the one light reception unit is capable of receiving,
the wavelength change instruction unit determines a downstream wavelength transmitted by a light transmission unit having a smallest transmission bandwidth ratio among the plurality of light transmission units, as the changeover target (Target) downstream wavelength, and the wavelength change instruction unit determines an upstream wavelength received by a light reception unit having a smallest reception bandwidth ratio among the plurality of light reception units, as the changeover target (Target) upstream wavelength.

3. The station-side device according to claim 1, wherein in a case where the wavelength change instruction unit has generated the downstream wavelength changeover instruction message, only the downstream wavelength assigned to the first subscriber-side device is changed and the upstream wavelength assigned to the first subscriber-side device is not changed, and in a case where the wavelength change instruction unit has generated the upstream wavelength changeover instruction message, only the upstream wavelength assigned to the first subscriber-side device is changed and the downstream wavelength assigned to the first subscriber-side device is not changed.

4. A station-side device that performs transmission and reception of optical signals with respect to one or more subscriber-side devices including a first subscriber-side device, by wavelength division multiplexing and time division multiplexing, the station-side device comprising:

a plurality of light transmission units including a first light transmission unit, each of the light transmission units transmitting a downstream signal to the one or more subscriber-side devices using a predetermined downstream wavelength;

a plurality of light reception units including a first light reception unit, each of the light reception units receiving an upstream signal from the one or more subscriber-side devices using a predetermined upstream wavelength;

a wavelength change instruction unit that generates a downstream wavelength changeover instruction message in a case where a downstream wavelength assigned to the first subscriber-side device, to which a downstream wavelength of a downstream signal transmitted by the first light transmission unit has been assigned, is to be changed from a currently used (Source) downstream wavelength transmitted by the first light transmission unit, to a changeover target (Target) downstream wavelength, the changeover target (Target) downstream wavelength being different from the currently used (Source) downstream wavelength, the downstream wavelength changeover instruction message indicating the changeover target (Target) downstream wavelength, the wavelength change instruction unit generating an upstream wavelength changeover instruction message in a case where an upstream wavelength assigned to the first subscriber-side device, to which an upstream wavelength of an upstream signal received by the first light reception unit has been assigned, is to be changed from a currently used (Source) upstream wavelength received by the first light reception unit, to a changeover target (Target) upstream wavelength, the changeover target (Target) upstream wavelength being different from the currently used (Source) upstream wavelength, the upstream wavelength changeover instruction message indicating the changeover target (Target) upstream wavelength, wherein the wavelength change instruction unit independently generates the downstream wavelength changeover instruction message and the upstream wavelength changeover instruction message, only the downstream wavelength assigned to the first subscriber-side device is changed in a case where the wavelength change instruction unit has generated the downstream wavelength changeover instruction message, and only the upstream wavelength assigned to the first subscriber-side device is changed in a case where the wavelength change instruction unit has generated the upstream wavelength changeover instruction message;

a light transmission state monitoring unit that monitors a transmission bandwidth ratio, the transmission bandwidth ratio being a ratio of a total bandwidth transmitted by the first light transmission unit to the one or more subscriber-side devices, to a bandwidth that the first light transmission unit is capable of transmitting; and a light reception state monitoring unit that monitors a reception bandwidth ratio, the reception bandwidth ratio being a ratio of a total bandwidth received by the first light reception unit from the one or more subscriber-side devices, to a bandwidth that the first light reception unit is capable of receiving, wherein in a case where an increase in the transmission bandwidth ratio becomes a predetermined value or more within a predetermined time period, the wavelength change instruction unit changes a wavelength assigned to the first subscriber-side device, to which the downstream wavelength transmitted by the first light transmission unit whose increase in the transmission bandwidth ratio becomes the predetermined value or more has been assigned, from the currently used (Source) downstream wavelength transmitted by the first light transmission unit, to a changeover target (Target) downstream wavelength that is different from the currently used (Source) downstream wavelength, and in a case where an increase in the reception bandwidth ratio becomes a predetermined value or more within a predetermined time period, the wavelength change instruction unit changes a wavelength assigned to the first subscriber-side device, to which an upstream wavelength received by the first light reception unit whose increase in the reception bandwidth ratio becomes the predetermined value or more has been assigned, from the currently used (Source) upstream wavelength received by the first light reception unit, to the changeover target (Target) upstream wavelength that is different from the currently used (Source) upstream wavelength.

5. A wavelength changeover method executed by a station-side device, the station-side device performing transmission and reception of optical signals with respect to one or more subscriber-side devices including a first subscriber-side device, by wavelength division multiplexing and time division multiplexing, the method comprising:

a wavelength change instruction step of: generating a downstream wavelength changeover instruction message in a case where a downstream wavelength assigned to the first subscriber-side device, to which a downstream wavelength of a downstream signal transmitted from the first station-side device has been assigned, is to be changed from a currently used (Source) downstream wavelength transmitted from the station-side device, to a changeover target (Target) downstream wavelength, the changeover target (Target) downstream wavelength being different from the currently used (Source) downstream wavelength, the downstream wavelength changeover instruction message indicating the changeover target (Target) downstream wavelength; and generating an upstream wavelength changeover instruction message in a case where an upstream wavelength assigned to the first subscriber-side device, to which an upstream wavelength of an upstream signal received by the station-side device has been assigned, is to be changed from a currently used (Source) upstream wavelength received by the station-side device, to a changeover target (Target) upstream wavelength, the changeover target (Target) upstream wavelength being different from the currently used (Source) upstream wavelength, the upstream wavelength changeover instruction message indicating the changeover target (Target) upstream wavelength, wherein, in the wavelength change instruction step, the downstream wavelength changeover instruction message and the upstream wavelength changeover instruction message are independently generated, only the downstream wavelength assigned to the first subscriber-side device is changed in a case where the downstream wavelength changeover instruction message has been generated, and only the upstream wavelength assigned to the first subscriber-side device is changed in a case where the upstream wavelength changeover instruction message has been generated; and a state monitoring step performed before the wavelength change instruction step, wherein each of a plurality of light transmission units within the station-side device transmits a downstream signal to the one or more subscriber-side devices using a predetermined downstream wavelength, and the light transmission units include a first light transmission unit, each of a plurality of light reception units within the station-side device receives an upstream signal from one or more subscriber-side devices using a predetermined upstream wavelength, and the light reception units include a light reception unit, the state monitoring step includes: monitoring a transmission bandwidth ratio, the transmission bandwidth ratio being a ratio of a total bandwidth transmitted by the first light transmission unit to the one or more subscriber-side devices, to a bandwidth that the first light transmission unit is capable of transmitting; and monitoring a reception bandwidth ratio, the reception bandwidth ratio being a ratio of a total bandwidth received by the first light reception unit from the one or more subscriber-side devices, to a bandwidth that the first light reception unit is capable of receiving, wherein, in the wavelength change instruction step, in a case where an increase in the transmission bandwidth ratio becomes a predetermined value or more within a predetermined time period, a wavelength assigned to a subscriber-side device, to which a downstream wavelength transmitted by the first light transmission unit whose increase in the transmission bandwidth ratio becomes the predetermined value or more has been assigned, is changed from a currently used (Source) downstream wavelength transmitted by the first light transmission unit, to a changeover target (Target) downstream wavelength that is different from the currently used (Source) downstream wavelength, and in a case where an increase in the reception bandwidth ratio becomes a predetermined value or more within a predetermined time period, a wavelength assigned to a subscriber-side device, to which an upstream wavelength received by the first light reception unit whose increase in the reception bandwidth ratio becomes the predetermined value or more has been assigned, is changed from a currently used (Source) upstream wavelength received by the light reception unit, to a changeover target (Target) upstream wavelength that is different from the currently used (Source) upstream wavelength.

\* \* \* \* \*